United States Patent
Tseng et al.

(10) Patent No.: US 6,231,824 B1
(45) Date of Patent: May 15, 2001

(54) REMOVAL OF NITRIC OXIDE FROM GAS STREAMS

(75) Inventors: James K. Tseng, Berkeley Heights, NJ (US); Mark H. Anderson, Bethlehem, PA (US); Shuen-Cheng Hwang, Chester, NJ (US); Robert Francis Workosky, Macungie, PA (US)

(73) Assignee: The BOC Group, Inc., Murray Hill, NJ (US)

( * ) Notice: Subject to any disclaimer, the term of this patent is extended or adjusted under 35 U.S.C. 154(b) by 0 days.

(21) Appl. No.: 09/371,315

(22) Filed: Aug. 10, 1999

(51) Int. Cl.⁷ .............................. C01B 21/00; B01J 8/00
(52) U.S. Cl. ................. 423/235; 423/239.1; 423/390.1; 423/393; 423/394
(58) Field of Search ................... 423/235, 239.1, 423/390.1, 393, 394

(56) References Cited

U.S. PATENT DOCUMENTS

| | | | |
|---|---|---|---|
| 3,674,429 | 7/1972 | Collins | 423/239.1 |
| 3,991,167 | * 11/1976 | Depommier | 423/393 |
| 4,119,703 | 10/1978 | Nishida et al. | 423/239.1 |
| 4,153,429 | 5/1979 | Matthews et al. | 55/68 |
| 4,160,013 | 7/1979 | Whelan | 423/239.1 |
| 4,975,256 | 12/1990 | Hegedus et al. | 423/235 |
| 5,206,002 | 4/1993 | Skelley et al. | 423/235 |
| 5,233,934 | 8/1993 | Krigmont et al. | 110/345 |
| 5,316,737 | 5/1994 | Skelley et al. | 422/170 |
| 5,417,950 | 5/1995 | Sheu et al. | 423/239.2 |
| 5,453,258 | 9/1995 | Lippmann et al. | 423/235 |
| 5,482,692 | 1/1996 | Audeh et al. | 423/239.1 |
| 5,514,204 | 5/1996 | Sheu et al. | 95/92 |
| 5,589,147 | 12/1996 | Farnos et al. | 423/239.2 |
| 5,612,010 | 3/1997 | Pandey et al. | 423/239.1 |
| 5,670,125 | 9/1997 | Sheu et al. | 423/239.2 |
| 5,670,127 | 9/1997 | Sheu | 423/405 |
| 5,743,929 | 4/1998 | Kapoor et al. | 65/134.6 |

* cited by examiner

*Primary Examiner*—Tom Dunn
*Assistant Examiner*—Maribel Medina
(74) *Attorney, Agent, or Firm*—Philip H. Von Neida; Salvatore P. Pace

(57) ABSTRACT

Nitric oxide is removed from a gas stream by contacting the gas stream with oxygen in the presence of a metal-cation exchanged zeolite, thereby oxidizing the nitric oxide to nitrogen dioxide, then contacting the resulting nitrogen dioxide-containing gas stream with ozone, thereby converting the nitrogen dioxide to nitric acid, nitric acid precursors or mixtures thereof, then contacting the gas stream with an aqueous liquid, thereby scrubbing the nitric acid, nitric acid precursors or mixtures thereof from the gas stream. Contact of the gas stream with oxygen in the presence of a zeolite is carried out at a temperature above the temperature at which significant adsorption of nitrogen dioxide occurs, and the aqueous liquid used as scrubbing agent preferably has a pH greater than 7.

5 Claims, 1 Drawing Sheet

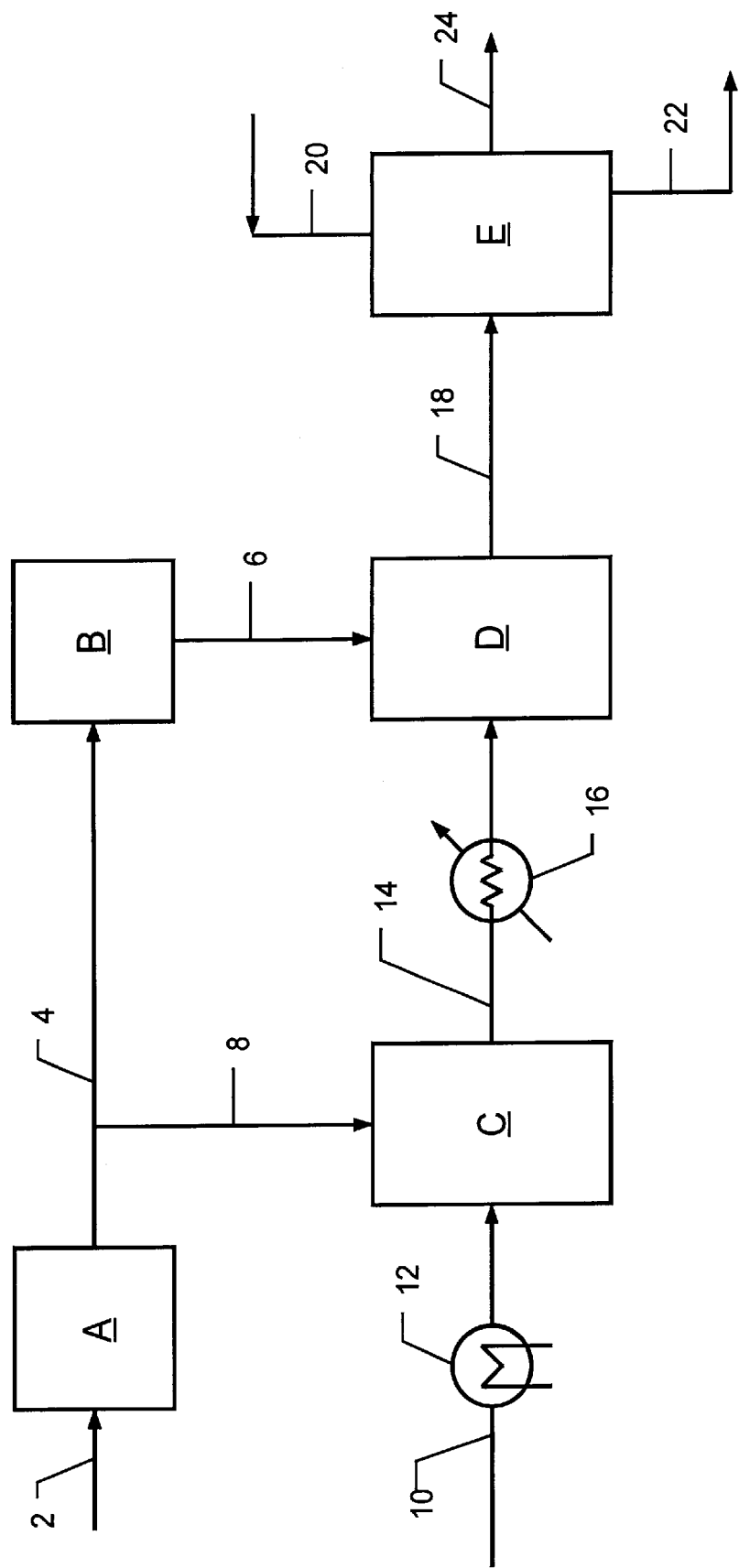

REMOVAL OF NITRIC OXIDE FROM GAS STREAMS

FIELD OF THE INVENTION

This invention relates to the removal of pollutants from gas streams, and more particularly to the reduction or elimination of nitrogen oxides from gaseous industrial plant effluents. Specifically, the invention relates to the reduction or elimination of nitrogen oxides from waste gas streams by oxidizing the nitrogen oxides to nitric acid or precursors thereof.

BACKGROUND OF THE INVENTION

Recent federal and local environmental laws require very significant reduction of discharge of harmful gaseous substances into the atmosphere. Chief among such harmful air pollutants are nitrogen oxides ($NO_x$). In response to strict enforcement efforts of these laws industrial air polluters have made considerable efforts to reduce the amount of these harmful substances into the air in gaseous effluents from industrial or municipal sources. Successful efforts to reduce the concentration of $NO_x$ in gaseous effluents often involve reacting the $NO_x$ in waste gases with nitrogen-based reducing agents. One commercially used method of reducing $NO_x$ from gas streams involves contacting the $NO_x$ with ammonia or an ammonia precursor, such as urea, in the absence of a catalyst, a technique known as selective non-catalytic reduction (SNCR). The ammonia reduces the $NO_x$ to nitrogen while itself being oxidized to nitrogen and water. Typical SNCR-based processes are disclosed in U.S. Pats. Nos. 5,233,934 and 5,453,258. SNCR processes require very high temperatures, for instance temperatures in the range of about 800 to 1200° C., and even at these temperatures only low conversions of $NO_x$ are achieved. For example, it is not uncommon to attain $NO_x$ reductions in the range of 40 to 50% by SNCR-based processes.

Another technique for removing $NO_x$ from waste gas streams involves contacting the waste gas with ammonia or an ammonia precursor in the presence of a substance which catalyzes the reduction of $NO_x$ to nitrogen, as in SNCR processes. These catalytic reduction processes are referred to as selective catalytic reduction (SCR). SCR processes have a few advantages over SNCR processes. They can be carried out at temperatures significantly lower than the temperatures at which SNCR processes are carried out. For example, they are quite effective at temperatures in the range of about 250 to 600° C. Typical SCR processes are described in detail in U.S. Pats. Nos. 4,119,703, 4,975,256, 5,482,692, 5,589,147, 5,612,010 and 5,743,929. Although SCR processes are much more efficient than SNCR processes in the reduction of $NO_x$ to nitrogen, they have the disadvantages of being more costly than SNCR processes, the catalyst can be poisoned or deactivated and often they do not remove all of the $NO_x$ from the gas stream being treated.

Another disadvantage of both SCR and SNCR processes is that ammonia, which itself is regarded as an environmentally unacceptable pollutant, is often released into the atmosphere in the gaseous effluent from the reactor because the reactions are often conducted in the presence of excess ammonia and/or because of sudden changes in the process that produces the $NO_x$. Ammonia may also be released because of depletion or masking of the catalyst by contamination over time.

Another known method of removing $NO_x$ from gas streams involves contacting the $NO_x$ with ozone, thereby oxidizing them to higher nitrogen oxides, such as $N_2O_5$ and removing the higher oxides from the gas stream by means of aqueous scrubbers.

Specific details of ozone-based $NO_x$ oxidation processes are disclosed in U.S. Pat. Nos. 5,206,002 and 5,316,737, the disclosures of which are incorporated herein by reference. Ozone-based $NO_x$ oxidation processes are quite expensive because of the high cost of producing ozone.

It is also known to oxidize NO to $NO_2$ and remove the $NO_2$ from gas streams by contacting a gas stream containing one or both of NO and $NO_2$ with oxygen, particularly in the presence of an $NO_2$-selective adsorbent which contains metal cations. The oxygen oxidizes the NO to $NO_2$, and the $NO_2$ is adsorbed from the gas stream by the adsorbent. Typical $NO_2$ adsorption processes are disclosed in U.S. Pat. Nos. 3,674,429, 4,153,429, 4,160,013, 5,417,950, 5,514,204, 5,670,125 and 5,670,127, the disclosures of which are incorporated herein by reference.

Because of stringent environmental regulations, efforts are continuously made to improve $NO_x$ removal processes to minimize or eliminate emission of $NO_x$ into the atmosphere. This invention provides a process which accomplishes this objective.

SUMMARY OF THE INVENTION

The invention provides a process for removing nitrogen oxides from a gas stream by a multi-step process comprising a first step comprising converting NO in the gas stream to $NO_2$ by contact with oxygen; a second step comprising oxidizing $NO_2$ and any NO remaining in the gas stream to nitric acid precursors and/or nitric acid with ozone; and a third step comprising scrubbing the nitric acid precursors and/or nitric acid from the gas stream with an aqueous liquid.

According to a broad embodiment, the invention comprises a process for removing nitric oxide from a gas stream comprising the steps:

(a) contacting the gas stream with oxygen at a temperature in the range of about 150 to about 1000° C., thereby oxidizing at least part of the nitric oxide in the gas stream to nitrogen dioxide;

(b) contacting the gas stream with ozone, thereby converting at least part of the nitrogen dioxide to nitric acid, nitric acid precursors or mixtures thereof; and (c) contacting the nitric acid, nitric acid precursors or mixtures thereof with an aqueous liquid, thereby scrubbing at least part of the nitric acid, nitric acid precursors or mixtures thereof from the gas stream.

In a preferred embodiment of the invention, step (a), above, is carried out in the presence of a catalyst which promotes the oxidation of nitric oxide to nitrogen dioxide. In a more preferred embodiment, the catalyst is a metal cation-exchanged zeolite. In another more preferred embodiment, the zeolite has as exchangeable cations sodium ions, calcium ions or mixtures thereof. In another more preferred embodiment, the zeolite is type A zeolite, type X zeolite, type Y zeolite or mixtures thereof. In another more preferred embodiment the zeolite is 4A zeolite, 5A zeolite, 13X zeolite, 10X zeolite, calcium-exchanged type Y zeolite, sodium-exchanged type Y zeolite or mixtures thereof.

In another preferred embodiment the aqueous liquid used in step (c) has a pH greater than 7 and step (c) comprises converting the nitric acid, nitric acid precursors or mixtures thereof to nitrate salt. In a more preferred embodiment, the pH of the aqueous liquid is at least about 9.

In another preferred embodiment, step (a) of the process is carried out at a temperature in the range of about 200 to about 600° C.

In another preferred embodiment, the aqueous liquid contains ammonium hydroxide, alkali metal hydroxides, alkaline earth metal oxides or mixtures thereof. In a more preferred embodiment, the aqueous liquid contains sodium hydroxide.

BRIEF DESCRIPTION OF THE DRAWINGS

The FIGURE is a schematic representation of one embodiment of a system in which the process of the invention can be practiced.

Only those valves, lines and equipment necessary for an understanding of the invention have been included in the drawings.

DETAILED DESCRIPTION OF THE INVENTION

The process of the invention effects the oxidation of nitric oxide in a gas stream to nitrogen dioxide, and then the oxidation of nitrogen dioxide and any other nitrogen oxides in the gas stream to $N_2O_5$, if the gas stream is substantially dry, or to nitric acid, if the gas stream contains moisture. In one currently practiced process, nitrogen oxides, including nitric oxide, are removed from a gas stream by contacting the gas stream with ozone. Reactions for the oxidation of nitric oxide and nitrogen dioxide to $N_2O_5$ using ozone as the oxidant are:

$$NO + 1\tfrac{1}{2}O_3 = \tfrac{1}{2}N_2O_5 + \tfrac{1}{2}O_2 \quad (1)$$

$$NO_2 + \tfrac{1}{2}O_3 = \tfrac{1}{2}N_2O_5 + \tfrac{1}{2}O_2 \quad (2)$$

An examination of equations (1) and (2) shows that it takes three times as much ozone to oxidize nitric oxide to $N_2O_5$ than to oxidize nitrogen dioxide to $N_2O_5$. In other words the oxidation of nitric oxide to nitrogen dioxide with ozone requires twice as much ozone as the oxidation of nitrogen dioxide to $N_2O_5$ with ozone. Since oxygen is less expensive to produce than is ozone and nitric oxide is readily oxidized to nitrogen dioxide using oxygen, it can be considerably less costly to remove nitric oxide from gas streams by a multi-step process comprising an oxygen-based oxidation step and an ozone-based oxidation step, particularly when the gas stream is available at elevated temperatures. This invention takes advantage of the fact that waste gas streams from many processes, especially industrial and municipal combustion processes, are available at elevated temperatures. The process of the invention can be particularly advantageous if the oxygen oxidation step is carried out in the presence of a catalyst, since this may eliminate the need to heat the gas stream.

In the first step of the process, the gas stream is contacted with oxygen, either in the presence or absence of a catalyst which promotes the oxidation of nitric oxide to nitrogen dioxide. Contact of the gas stream with oxygen takes place at a temperature sufficiently high to convert substantially all of the nitric oxide in the gas stream to nitrogen dioxide. Typically, this step is carried out at a temperature of at least 100° C., and, for reasons of cost, it is usually carried out at temperatures not in excess of 1000° C., although higher temperatures can be employed, if desired. When no catalyst is present, the nitric oxide oxidation step is usually carried out at a temperature in the range of about 250 to about 1000° C. When a catalyst is present the reaction may be carried out at temperatures as low as about 100° C., and it is usually carried out at temperatures up to about 600° C. The reaction is preferably carried out at temperatures in the range of about 150 to about 400° C., in the presence of a catalyst.

In the most preferred embodiments of the invention the oxygen oxidation step is carried out using a relatively inexpensive zeolitic material as the catalyst. Suitable zeolites contain metal ions as exchangeable cations. The metal ion on the zeolite promotes the oxidation of nitric oxide to nitrogen dioxide. The zeolitic material can be any metal ion-containing natural or synthetic zeolite. Suitable natural zeolites include faujasite, mordenite, chabazite, offretite, erionite, ferrierite, gmelinite, beta, omega, etc. Suitable synthetic zeolites include type A zeolite, type X zeolite, type Y zeolite, EMC-3, etc. Preferred zeolites are the synthetic zeolites, particularly, type A zeolite, type X zeolite and type Y zeolite.

Typical of the metal ions that are suitable as exchangeable cations are those of groups 1A, 1B, 2A and 2B of the periodic table of elements. Example of ions in these groups are sodium, potassium, lithium, calcium, magnesium, barium, strontium, zinc, silver, copper (II) ions, protons and combinations of two or more of these. Preferred cations include sodium, potassium, lithium, calcium, magnesium and mixtures of these. Other cations, such as the trivalent ions, for example the lanthanides, can be included in the zeolite, particularly at low concentrations.

Examples of preferred zeolites include 4A zeolite, 5A zeolite, 10 X zeolite, 13X zeolite, sodium-exchanged type Y zeolite, calcium-exchanged type Y zeolite, etc.

When the oxygen-based nitric oxide oxidation step is carried out in the presence of a zeolite, it is preferred that this step be carried out at conditions such that the nitrogen dioxide in the gas stream is not adsorbed by the zeolite. This can be accomplished by carrying out this step of the process at a temperature sufficiently high that little or no nitrogen dioxide is adsorbed by the zeolite. Thus, this step is generally carried out at a temperature above about 100° C., is preferably above about 150° C., and is most preferably carried out at a temperature above about 200° C. Alternatively, or additionally, the oxygen oxidation step can be carried out at a pressure sufficiently low that little or no nitrogen dioxide is adsorbed. This can be effectively accomplished by conducting this step at a pressure below about 1.5 bar absolute (bara), and preferably below about 1.2 bara, and most preferably at or below atmospheric pressure. Most preferably, the oxygen oxidation step is carried out at about atmospheric pressure, i.e., the pressure at which most industrial process exhaust gases are discharged. Thus, the oxygen oxidation step is generally carried out at temperatures in the range of about 100 to about 600° C., is preferably carried out at temperatures in the range of about 150 to about 500° C., and is most preferably carried out at temperatures in the range of about 200 to about 400° C.; and/or is generally carried out at pressures in the range of about 0.7 to about 1.5 bara, is preferably carried out at pressures in the range of about 0.8 to about 1.2 bara and is most preferably carried out at about atmospheric pressure. This step of the process can also be carried out under conditions such that nitrogen dioxide is adsorbed by the zeolite catalyst. In this case, the adsorbent is not regenerated when it is saturated with nitrogen dioxide, so that after the adsorbent is saturated, nitrogen dioxide will pass through the adsorbent and be sent to the second step of the process with the remainder of the gas stream being processed.

The second step of the process is carried out using ozone as the oxidizing agent.

During the course of this step nitrogen dioxide produced during the first step or originally present in the gas stream, and other nitrogen oxides, such as $N_2O_4$, present in the gas stream are oxidized to a higher oxidation state, typically to $N_2O_5$, or to nitric acid, if sufficient moisture is present in the gas stream to hydrate the $N_2O_5$.

The ozone-based $NO_x$ oxidation step is conducted at temperatures lower than the temperature at which the oxygen-based nitric oxide oxidation step is carried out. Accordingly, the gas exiting the first step is cooled prior to the second step of the process. Typically, the ozone oxidizing step is carried out at a temperature in the range of about 0 to 200° C., and it is preferably carried out at a temperature in the range of about 20 to about 100° C., to minimize dissociation of the ozone. The pressure at which this step is carried out is not critical. Generally this step is carried out at about atmospheric pressure.

The $NO_x$ oxidation step proceeds according to the equations:

$$NO + O_3 \rightarrow NO_2 + O_2 \qquad (3)$$

$$2NO_2 + O_3 \rightarrow N_2O_5 + O_2 \qquad (4)$$

$$N_2O_4 + O_3 \rightarrow N_2O_5 + O_2 \qquad (5)$$

The $NO_x$ oxidation step is known, and specific details of this step are not a part of the invention. Specific details of the $NO_x$ oxidation step are disclosed in U.S. Pat. Nos. 5,206,002 and 5,316,737, the disclosures of which are incorporated herein by reference.

The aqueous liquid scrubbing step is preferably carried out at a pH greater than 7, and is most preferably carried out at a pH greater than 9. The aqueous liquid may be water, in which case a dilute aqueous nitric acid solution will be produced. However, in preferred embodiments, the aqueous liquid is a dilute basic solution. Suitable basic aqueous solutions include alkali metal hydroxides, such as sodium hydroxide, potassium hydroxide, etc. and alkaline earth metal hydroxides, such as calcium hydroxide, magnesium hydroxide, etc. and ammonium hydroxide. Preferably the aqueous solution contains a base having good water solubility, such as sodium hydroxide, potassium hydroxide, ammonium hydroxide, etc. A more preferred caustic solution is aqueous sodium hydroxide, which is readily available, relatively inexpensive and produces environmentally acceptable products upon reaction with the flue gas components. The temperature and pressure at which the aqueous scrubbing step are carried out is not critical. This step is typically carried out at a temperature in the range of about 10 to about 90° C., and is preferably carried out at a temperature in the range of about 20 to about 60° C. and is generally carried out at about atmospheric pressure.

The invention can be more easily understood by reference to the appended drawing. The system illustrated in the drawing includes, as major equipment units, oxygen generator A, ozone generator B, nitric oxide oxidizing reactor C, nitrogen oxides ozone oxidizing reactor D and aqueous liquid scrubber E. All of these units are well known and details of their design and construction form no part of this invention.

Oxygen generator A can be any equipment that produces oxygen or oxygen-enriched gas from air. Typically, generator A is an adsorption unit or a small cryogenic air separation plant. Alternatively, oxygen or oxygen-enriched air can be introduced into the system from an external source. In the embodiment illustrated in the drawing, generator A is provided with air feed line 2, and oxygen discharge line 4. Line 4 is connected to the inlet end of ozone generator B. Ozone generator B can be any type of ozonizer, such as a high voltage corona discharge generator. Ozone generators are standard equipment and well known in the industry, and their design and operation form no part of this invention. Typically, the ozone containing gas comprises about 3 to about 10% by weight ozone and the balance oxygen or air components.

Line 8 connects oxygen discharge line 4 to the oxygen inlet end of nitric oxide oxidizing reactor C. Reactor C can be any type of reactor that is suitable for the oxidation of nitric oxide with oxygen. For example, it can be an empty chamber or it can contain a catalyst, for instance, a bed of catalyst through which the reactants are passed. Reactor C is also provided with nitric oxide containing gas feed line 10, which is equipped with heater 12, and oxidized gas outlet line 14, which is provided with gas cooler 16. On its downstream end, line 14 is connected to the inlet end of ozone oxidizing reactor D.

Ozone reactor D may be any reactor suitable for effecting the intimate mixing of the nitrogen oxides-containing gas stream entering reactor D through line 14 and ozone, which enters reactor D through line 6. Thus, reactor D may be an empty vessel containing mixing baffles, or it may be packed with an inert material to enhance contact between the ozone and the gas being treated. On its outlet end, reactor D is provided with oxidized gas discharge line 18, which is connected to the inlet end of gas scrubber E.

Scrubber E is provided with scrubbing liquid feed line 20, scrubbing liquid discharge line 22 and purified gas discharge line 24. Scrubber E may be any suitable vessel, and can be equipped with baffling or an inert substance to enhance contact between the scrubbing liquid and the gas being purified.

In the following description, it will be assumed that the gas stream being treated in the process of the invention is a furnace flue gas containing nitric oxide, and perhaps one or more nitrogen oxides, such as nitrogen dioxide and/or $N_2O_4$.

In practicing the process of the invention in the illustrated system, air, introduced into the system through line 2, is separated into an oxygen-enriched stream, such as high purity oxygen, and, perhaps, a nitrogen-enriched gas stream. The oxygen-enriched product gas is discharged from reactor A through line 4. Part of the oxygen-enriched gas enters ozone generator B and the remainder passes directly to nitric oxide oxidizing reactor C via line 8. Meanwhile, a nitric oxide-containing gas, such as an exhaust gas from a combustion process, enters the system through line 10. The nitric oxide-containing gas entering the system may already be at the temperature at which it is desired to conduct the oxidation step in reactor C, or it is heated to the desired temperature, for example 200 to about 400° C., as it passes through heater 12. The hot gas then enters reactor C wherein it comes into intimate contact with the oxygen entering reactor C through line 8. Reactor C is preferably designed to effect substantially complete oxidation of all nitric oxide contained in the gas being purified to nitrogen dioxide.

The oxygen-enriched gas entering ozone generator B through line 4 is generally ozonized in generator B to the extent that the gas stream entering reactor D through line 6 contains about 3 to 10% by weight ozone. The ozone containing gas comes into intimate contact with the nitrogen oxides-containing gas stream entering reactor D through line 14. Prior to its introduction into reactor D, the nitrogen oxides-containing gas is cooled to the temperature at which it is desired to conduct the ozone-oxidation step. Upon contact with the ozone, most or all of the nitrogen oxides contained in the waste gas leaving reactor C are oxidized to $N_2O_5$ or nitric acid (when the gas stream contains moisture).

The reactor D effluent passing through line 18 enters scrubber E wherein it comes in contact with the scrubbing liquid entering scrubber E through line 20. The scrubbing liquid, which is desirably in the form of a spray, if the scrubber E is a hollow chamber and in the form of a trickle stream if scrubber E is packed with inert packing, washes the $N_2O_5$ and/or nitric acid from the gas being treated. If the scrubbing liquid is water, the liquid passing out of scrubber E through line 22 is a dilute solution of nitric acid. In the preferred embodiment, the scrubbing liquid contains hydroxide, in which case the solution leaving the scrubber is a nitrate solution, which can be easily and safely disposed of. The purified flue gas, now substantially depleted of nitrogen oxides., passes out of the system through line 24 and is discharged to the atmosphere or further processed.

It will be appreciated that it is within the scope of the present invention to utilize conventional equipment to monitor stream concentrations and automatically regulate the flow of the various process streams within the system so that the system can be fully automated to run continuously in an efficient manner.

Although the invention has been described with particular reference to specific equipment arrangements and to a specific experiment, these features are merely exemplary of the invention and variations are contemplated. As noted above, oxygen or oxygen-enriched air can be imported directly into the system for use in step (a) and as feed to ozone generator B. The scope of the invention is limited only by the breadth of the appended claims.

What is claimed is:

1. A process for removing nitric oxide from a gas stream comprising the steps:
   (a) contacting said gas stream with oxygen at a temperature in the range of about 150 to about 1000° C. in the presence of a catalyst, thereby oxidizing at least part of the nitric oxide in said gas to nitrogen dioxide;
   (b) contacting said gas stream with ozone, thereby converting at least part of said nitrogen dioxide to nitric acid, nitric acid precursors or mixtures thereof; and
   (c) contacting said nitric acid, nitric acid precursors or mixtures thereof with an aqueous liquid, thereby scrubbing at least part of said nitric acid, nitric acid precursors or mixtures thereof from said gas stream.

2. The process of claim 1, wherein said catalyst is a metal cation-exchanged zeolite.

3. The process of claim 2, wherein said zeolite is A zeolite, X zeolite Y zeolite or mixtures thereof.

4. The process of claim 3, wherein said zeolite is 4A zeolite, 5A zeolite, 13X zeolite, 10 X zeolite, calcium-exchanged Y zeolite, sodium-exchanged Y zeolite or mixtures thereof.

5. The process of claim 2, wherein said zeolite has as exchangeable cations sodium ions, calcium ions or mixtures thereof.

* * * * *